Aug. 3, 1954   P. DARGIER DE SAINT VAULRY   2,685,655
OSCILLATORY MOTOR
Filed Dec. 22, 1949
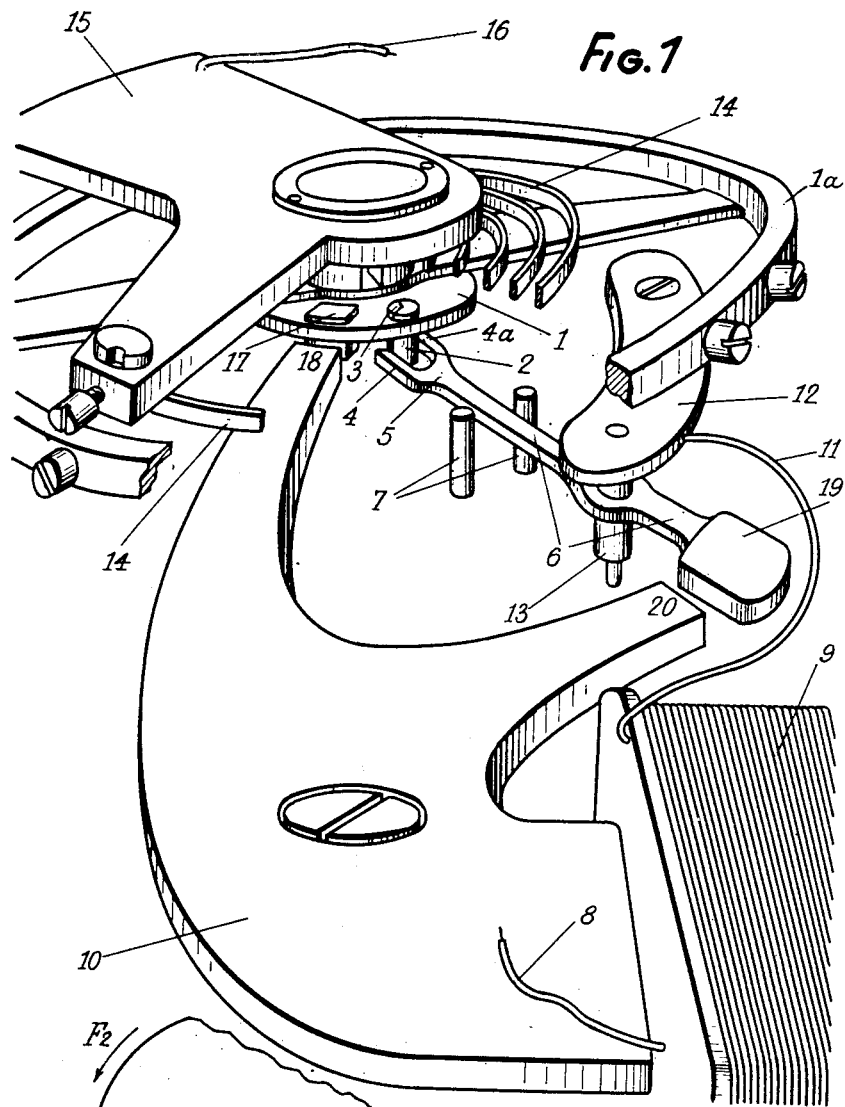
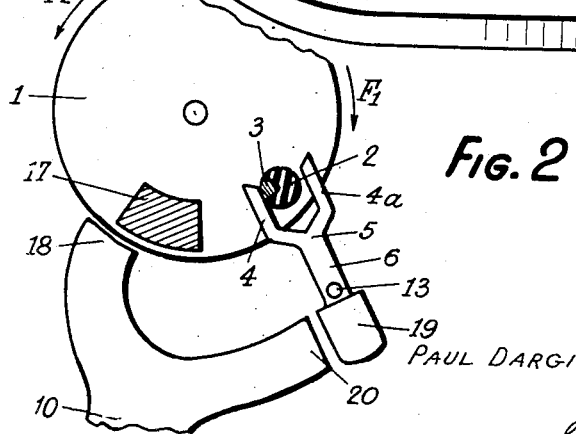
INVENTOR
PAUL DARGIER DE SAINT VAULRY
Strauch & Hoffman
ATTORNEYS Patented Aug. 3, 1954

2,685,655

UNITED STATES PATENT OFFICE 2,685,655

OSCILLATORY MOTOR

Paul Dargier de Saint Vaulry, Chatou, France, assignor to Lip S. A. d'Horlogerie, Besancon (Doubs), France Application December 22, 1949, Serial No. 134,413

1 Claim. (Cl. 310—39)

The present invention has for its object a system for distributing electromagnetic impulses through an elastic balance wheel. This arrangement allows sending on one hand into a circuit periodical electric impulses through an elastic balance wheel and on the other hand keeping up the pendular movement of the balance wheel through induced magnetic impulses.

The system according to the invention includes chiefly a mass of mild iron carried by the balance wheel and adapted to be magnetised through induction inside a nonuniform magnetic field.

A further feature of my invention consists in the application of a switch cutting out the magnetic field whenever the mass of mild iron has reached the point where the intensity of the magnetic field is at a maximum.

Said switch may be constituted by a pin or the like element rigid with the balance wheel and passing with some play between the two arms of a fork adapted to rock round an axis parallel to the geometrical axis of the field.

Furthermore, said switch fork may be provided with a further mass of mild iron at the end thereof opposed to the ends of said two arms.

In order to allow a clearer understanding of the invention, the latter has been illustrated by way of example and by no means in a binding sense in accompanying drawings relating to an improved clockwork.

In said drawings:

Fig. 1 is a diagrammatic perspective view of an arrangement according to my invention.

Fig. 2 is a diagrammatic view of a detail.

As illustrated, the plate I rigid with the balance wheel Ia is provided with a pin 2 assuming a cylindrical shape and having a geometrical axis parallel to the axis of the balance wheel.

Said pin made of insulating material includes a sector 3 of inoxidisable metal adapted to come into contact with the inner surface of the tine 4 of the pivoting fork 5 inside which it lies.

When the balance wheel Ia rocks round its axis, the pin 2 produces a reciprocating movement of the switch illustrated as a whole at 6, said fork 5 being thus shifted between the two stops 7—7.

The electric contact between the sector 3 on the pin 2 and the tine 4 on the switch fork 5 is thus alternatingly made and broken.

The switch constituted by said sector 3 and arm 4 is inserted in an electric circuit including a battery that is not illustrated, a connecting wire 8, a coil 9 wound over a mild steel or iron core 10, a connecting wire 11 feeding through the bridge member 12, the pivoting switch 6 carried by the spindle 13, the sector 3, the plate I rigid with the balance wheel Ia, the hair-spring 14, the stationary bridge member 15 for the balance wheel and lastly the connecting wire 16.

The periodical opening and closing movement of the contact between 3 and 4 produces electric pulses in the coil 9 and magnetic pulses in the cooperating mild steel core 10.

The plate I carries a mild steel member 17 moving inside the magnetic field thus produced by the pole 18 on the core 10 when the balance wheel Ia moves with said member 17 round the axis of the balance wheel.

The fork 5 of the switch carries also a further mass of mild steel or iron 19 located in proximity with the other polar end 20 of the core 10.

The operation of the arrangement is as follows: When the plate I rigid with the balance wheel rotates in the direction of the arrow F1 (Fig. 2) the sector 3 of the pin 2 comes into contact with the tine 4 of the fork 5.

The current flows then through the electric circuit defined hereinabove, 8, 9, 11, 12, 5, 4, 3, 1, 14, 15, 16 and the mild steel core 10 becomes the seat of a magnetic flux. A part of said magnetic flux serves for feeding through induction the mild steel mass 17 that has a tendency therefore to come nearer the pole 18 and to accelerate consequently the rotation of the balance wheel. Simultaneously the mild steel member 19 secured to the switch fork 5 is submitted to an induced magnetisation and is attracted by the pole 20, which results in urging the tine 4 of the switch fork against the sector 3 and in reducing the electrical resistance at the point of contact between the two members 3 and 4.

During the rotation of the plate I, the pin 2 produces a rocking of the switch 6 round the spindle 13 until said pin rides over the tine 4 and releases the inside of the fork 5. At this moment the contact is broken between 3 and 4 while the mild steel mass 17 lies in front of the pole 18. The balance wheel continues then its rocking up to its maximum elongation.

After reaching said maximum point of elongation, the balance wheel submitted to the action of the hair-spring 14 starts turning backwards in the direction of the arrow F2 (Fig. 2).

As it passes in front of the switch fork 5, the pin 2 engages the arms thereof and returns said fork into its original position through action on the second tine 4a of the fork. As there is no electric contact between the insulating plug 2 and the tine 4a of the fork 5, consequently there is no longer any magnetic flux induced inside the core 10 that might prevent the balance wheel from continuing its rotation.

The system disclosed is applicable in particular to clockworks and also in all cases where it is desired to keep up a pendular movement.

What I claim is:

In a system for distributing electromagnetic pulses to a balance wheel rocking round its axis, the combination of a mass of mild steel carried by the balance wheel in a predetermined radial location thereon, a stationary magnetic core on the outside of the balance wheel and including two poles of which one extends into proximity with the periphery of the balance wheel to register with a predetermined point of the path of the mild steel mass, a magnetizing circuit for said core, a pin rigid with the balance wheel at a point angularly spaced with reference to the mild steel mass, a two-armed switch lever adapted to pivot round a stationary axis parallel with the balance wheel axis and including at the end of one arm a fork the tines of which are adapted to enclose the pin on the balance wheel for drivingly engaging same during a fraction of the travel of said pin in either direction of movement of the balance wheel with a slight clearance on the non-driven side of the fork, said pin and lever being inserted in the circuit in a manner such that the engagement of the pin with the tine of the switch fork nearest the mild steel mass provides for the opening of the magnetizing circuit for one direction of movement of the balance wheel and the contact of the pin with the tine of the switch fork on the side furthest from the mild steel mass closing said circuit for the other direction of movement, said switch lever including at the free end of the other arm a mass of mild steel adapted to move in front of the second pole of the core and to be attracted thereby to urge the first switch arm into its circuit closing position whenever the magnetizing circuit is closed by the pin and the first fork tine.

References Cited in the file of this patent

UNITED STATES PATENTS

| Number | Name | Date |
|---|---|---|
| 1,400,832 | Shaw | Dec. 20, 1921 |
| 2,459,930 | Fink | Jan. 25, 1949 |

FOREIGN PATENTS

| Number | Country | Date |
|---|---|---|
| 668,919 | France | July 23, 1929 |
| 410,732 | Great Britain | Aug. 18, 1932 |